Dec. 25, 1956  K. R. HONICK  2,775,126
DENSITOMETERS FOR MEASURING THE SPECIFIC GRAVITY OF LIQUIDS
Filed Oct. 13, 1953  2 Sheets-Sheet 1
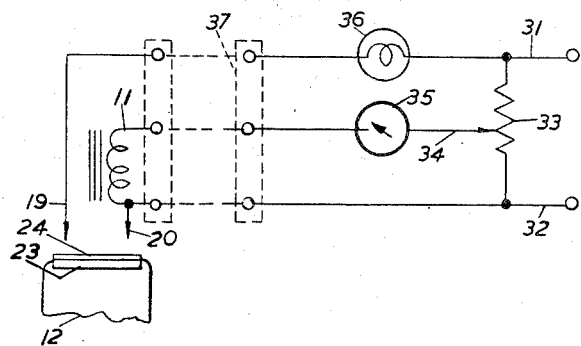
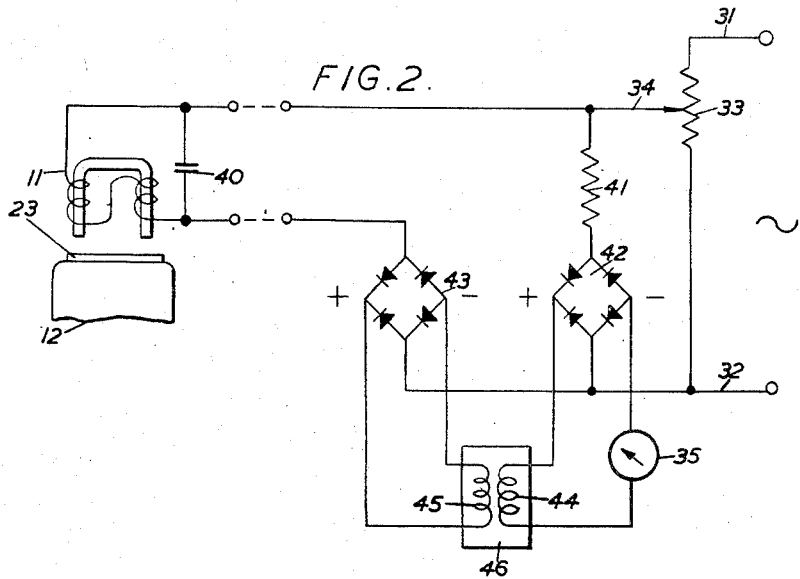
Inventor
Kenneth R. Honick
By Watson, Cole, Grindle
Watson
Attorneys Dec. 25, 1956 K. R. HONICK 2,775,126
DENSITOMETERS FOR MEASURING THE SPECIFIC GRAVITY OF LIQUIDS
Filed Oct. 13, 1953 2 Sheets-Sheet 2

Inventor
Kenneth R. Honick

By Watson, Cole, Grindle
 & Watson
Attorneys

United States Patent Office 2,775,126
Patented Dec. 25, 1956

---

2,775,126

DENSITOMETERS FOR MEASURING THE SPECIFIC GRAVITY OF LIQUIDS

Kenneth Robert Honick, Mytchett, near Aldershot, England, assignor to Simmonds Aerocessories Limited, Pontypridd, Glamorganshire, Wales Application October 13, 1953, Serial No. 385,842

Claims priority, application Great Britain October 15, 1952

8 Claims. (Cl. 73—453)

This invention relates to densitometers and has for an object to provide simple and reliable apparatus for affording at a remote observation point, an indication of the specific gravity of fuel or other liquid. Apparatus according to the invention may also be used in conjunction with flow meters and other devices functioning in terms of volume to provide information in terms of mass.

Remote indicating densitometer apparatus according to the invention includes a float for total immersion in a liquid to tend to rise or sink therein to a position determined by a stop, magnetic means for influencing said float against said tendency, remote means for progressively increasing the influence of said magnetic means and affording an indication of its magnitude, and, means for affording a remote indication when the float shifts a certain small distance from the stop.

In general, the magnetic means will comprise a fixed electro-magnet and a magnetic material armature associated with the float, the remote means for progressively increasing the influence of the magnetic means being comprised by a variable voltage source of current for the electro-magnet.

The means for affording a remote indication when the influence of the magnetic means is sufficient to shift the float may include switch means which is actuated by the float when it is shifted by said influence.

Preferably, for alternating current operation advantage is taken of the change in inductance of the electro-magnet when the float is shifted by the influence of the latter and the armature is in its fully attracted position to afford the remote indication that said influence is sufficient to shift the float, by providing a shunt comparison circuit in which the current is not affected substantially or at all by said inductance change and means responsive to the change in the electro-magnet current relative to the comparison circuit current.

The invention is illustrated by the accompanying diagrammatic drawings of which:

Figure 1 is a circuit diagram of one form of apparatus in accordance with the invention employing switch means associated with the float.

Figure 2 is a circuit diagram of another form of apparatus in accordance with the invention for alternating current operation and in which the use of such switch means is avoided.

Figure 3:
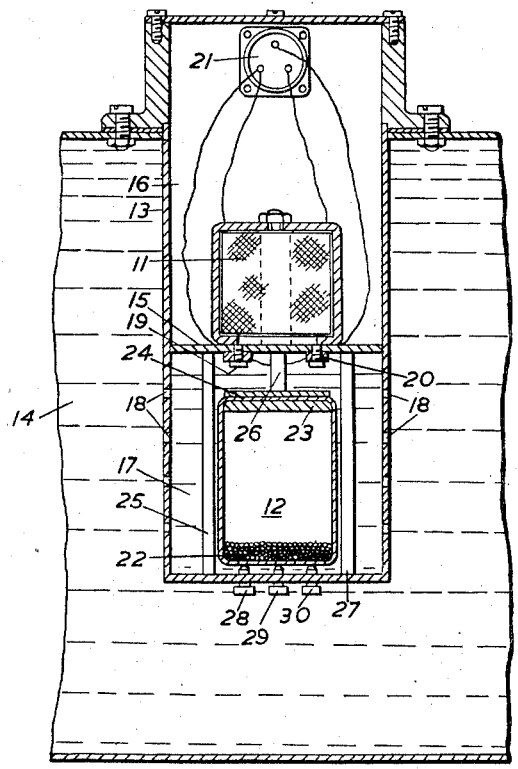
Figure 3 is a sectional view showing a form of float and electro-magnet assembly suitable for use in the apparatus of Figure 1.

Referring first to Figures 1 and 3, in which the same references denote the same parts, a local assembly comprises essentially an electro-magnet 11 and a float 12. As shown in Figure 3 a cylindrical housing, indicated generally at 13, depending into a liquid container, indicated at 14, is divided by a partition 15 into a liquid tight upper compartment 16 and a lower compartment 17 which latter is open to liquid in the container 14 by the way of apertures 18 in its curved wall. The electro-magnet 11 is secured to the partition 15, which is of non-magnetic material and carries at its underside two insulated resilient electric contacts 19, 20, leads from the electro-magnet 11 and said contacts extending to a three way connector 21 at the upper part of the housing 13 above the top of the liquid container 14. The float 12 which may be made of thin metal or other convenient material is of hollow cylindrical formation and is weighted by lead shot 22 set in synthetic resin cement so that it will just sink in liquid which is of the greatest specific gravity required to be indicated. There is cemented to the upper end of the float internally a soft iron or other magnetic material armature 23 and externally a silver foil or other contact strip 24 for co-operation with the resilient contacts 19, 20. The float 12 is guided for free up and down movement by three equally spaced rods 25, 26, 27 between the contacts 19, 20, and three round ended and adjustable stop screws 28, 29, 30 in the bottom of the housing 13 symmetrically about its axis and upon which the float 12 rests when the electromagnet is not excited.

The connector 21 is connected by a cable with a remote indicating assembly, which see Figure 1, comprises supply connections 31, 32, a potentiometer 33, 34 whose resistance element 33 bridges the supply connections 31, 32, a milliamperemeter 35, a lamp 36 and a three way connector 37 whose contacts are connected one direct with the supply connection 32, one through the meter 35 with the wiper 34 of the potentiometer 33, 34 and one through the lamp 36 with the supply connection 31. The connections between the two assemblies are as indicated in Figure 1 such that the electro-magnet 11 is connected in series with the meter 35 between the wiper 34, and the two resilient contacts 19, 20 are connected in series with the lamp 36 between the two supply connections 31 and 32.

In use, wiper 34 is moved upwards (Figure 1), thus progressively increasing the excitation of the electro-magnet 11. When the consequent magnetic attraction of the armature 23 is sufficient to overcome the tendency of the float to sink onto the stop screws 28, 29, 30, the float rises, brings the contact strip 24 to bear across the resilient contacts 19, 20 and so lights the lamp 26. Thereupon the upward movement of the wiper 34 is stopped and the current in the electro-magnet 11 as indicated by the meter 35 is a measure of the difference between the specific gravity of the float 12 and that of the liquid 14 in which it is immersed.

If desired the meter 35 may be calibrated in terms of specific gravity.

The use of the meter 35 in Figure 1 makes the accuracy of the apparatus independent of fluctuations of the voltage of the source (not shown) of electricity employed, which may be either direct current or alternating current.

If, however, a less degree of accuracy is sufficient, or if a constant voltage source be employed, then the meter 35 may be omitted and the potentiometer 33, 34 may be calibrated to enable readings to be taken.

In Figure 2 the same reference numerals indicate the same parts as in Figures 1 and 3. The apparatus of which Figure 2 is a circuit diagram is for use with an alternating current source (not shown) and is suitable for use when the specific gravity of electrolytes is to be indicated because it has no switch gear associated with the float.

The electro-magnet and float assembly is substantially the same as that of the Figures 1 and 3 apparatus except that, besides the omission of the contacts 19, 29 and 24, the electro-magnet 11 is of horseshoe type as shown in Figure 2, and is shunted by a condenser 40. Instead of a lamp circuit connected as in Figure 1 across the supply connections, the Figure 3 apparatus has a comparison circuit comprising a resistance 41 and a bridge type rectifier device 42 connected in series with one another between the wiper contact 34 and the supply connection 32 and the electro-magnet 11 is connected between said wiper contact 34 and supply connection 32 in series with a similar rectifier device 43. The direct current outputs of the two rectifiers 42 and 43 are connected to the two windings 44 and 45, respectively of a known type of relay or other electro-magnetic device, indicated generally at 46, responsive to the resultant field of said two windings 44 and 45.

The electro-magnet 11 and its shunt condenser 40 are such as together to constitute a tuned circuit which is resonant at the supply frequency when the float 12 has been lifted by excitation of the magnet 11 and the armature 23 is bridging the poles of the magnet 11 thus substantially increasing its effective inductance.

In use, the wiper 34 is moved upwardly. When the electro-magnet 11 is thereby sufficiently excited the float 12 rises and the armature 23 bridges the poles of the electro-magnet 11 when current through the electro-magnet 11 and the rectifier 43 and consequently in the winding 45 falls in relation to that in the comparison circuit 41, 42 and in the winding 44, thus causing the device 46 to operate, and as soon as this occurs, the upward movement of the wiper 34 is stopped and the current in the winding 44, indicated by a meter 35 in series therewith, will be a measure of the difference between the specific gravity of the float 12 and that of the liquid in which it is immersed. It is desirable, however, that the impedance of the source employed should be low, or, alternatively, that the comparison circuit 41, 42 should be fed from a separate potentiometer ganged with the potentiometer 33, 34 for adjustment simultaneously therewith.

Here again the meter may be calibrated in terms of specific gravity.

Here also, the meter 35 may be omitted and the potentiometer 33, 34 may be calibrated if the potential of the source employed be sufficiently constant for the degree of accuracy required.

It will be apparent that apparatus according to the invention may take a variety of forms and that the examples described above may be elaborated. For example, the contacs 19, 20, 24 of Figure 1 or the device 46 of Figure 3 may serve when the float 12 rises to interrupt the drive to a motor driven potentiometer at 33, 34, provision being made for resetting after each reading has been taken. Again, an arcuate type potentiometer at 33, 34 may be driven continuously so that the float 11 will be raised once per revolution thereof and said contacts 19, 20, 24 or said device 46 may be arranged to actuate recording means each time the float 11 rises.

I claim:

1. Remote indicating densitometer apparatus for use with liquids within a predetermined density range, including a stop, a float mounted for movement totally immersed in a liquid the density of which is to be measured towards and away from a position defined by said stop, the density of the float being predetermined such that for any liquid in said range the float tends to move in one direction only towards the stop under the action of gravity, magnetic means providing the sole means for influencing the float in the other direction, remote means for progressively increasing the influence of said magnetic means until the float is shifted from the stop, electrical circuit means for sensing when the float has moved a small distance from the stop, and remote means for indicating the magnitude of the influence of the magnetic means whereby said indication at the time when the circuit means senses said movement of the float provides a measure of the density of the float relative to the liquid.

2. Apparatus as claimed in claim 1 for use with dielectric liquids, wherein said circuit means includes contacts, means forming part of said float for completing an electric circuit through said contacts when the float has moved away from the stop by a predetermined distance and indicator means effective on completion of said circuit.

3. Apparatus as claimed in claim 1, wherein said magnetic means includes a stationary electromagnet and an armature of magnetic material forming part of the float.

4. Apparatus as claimed in claim 1 for use with dielectric liquid, comprising a pair of electric supply connections, and wherein said means for increasing the influence of the magnetic means comprises a potentiometer having a resistance element bridging said connections and a wiper, said magnetic means comprises an electromagnet circuit between the wiper and one supply connection and an armature of magnetic material forming part of the float, said electrical circuit means comprises a pair of contacts one connected to either supply connection, a conductive strip on the float to bridge the contacts on movement of the float from the stop by a predetermined distance, and means giving a visual indication on completion of the circuit through said contacts and strip, and said remote indicating means comprises current-responsive means in series with the wiper and the electro-magnet.

5. Apparatus as claimed in claim 1, wherein said electrical circuit means includes a winding for supply by an A. C. source, said float comprises magnetic material which changes the inductance of said winding on movement of the float from said stop and said circuit means further comprises means responsive to change in current through said winding consequent upon change of inductance thereof.

6. Remote indicating densitometer apparatus for use with liquids within a predetermined density range, including a stop, a float mounted for movement totally immersed in a liquid the density of which is to be measured towards and away from a position defined by said stop, said float having a fixed density such that for any liquid within said range the float tends to move in one direction only towards said stop under the influence of gravity, an electro-magnet having a winding for excitation by an A. C. source, the float comprising an armature of magnetic material and the electro-magnet and float cooperating whereby the electromagnet attracts the float in the other direction and the float changes the inductance of the winding on movement from the stop, remote means for progressively increasing the alternating current in said winding, means effective to sense said inductance drop, and means giving a signal dependent on the voltage across said winding when the inductance drop is sensed.

7. Apparatus as claimed in claim 6, including A. C. supply connections, a capacitance shunting the electromagnet winding to constitute therewith a tuned circuit resonant at the freuency of the A. C. source with the float in fully attracted position, a potentiometer having a resistance element bridging said supply connections and a wiper, a bridge-type rectifier device providing a pair of D. C. output terminals and being connected in series with the electro-magnet between the wiper and one supply connection, a resistor, a second bridge-type rectifier providing a pair of D. C. output terminals and being connected in series with the resistor between the wiper and said one supply connection, an electromagnetic device having two windings one connected to the D. C. output terminals of the first rectifier device and the other connected to the D. C. output terminals of the second rectifier device, said coils being arranged in opposition to afford an indication when the effect of one changes in relation to the effect of the other, and a current responsive device in series with said other coil of the electromagnetic device.

8. Apparatus as claimed in claim 6, including a comparison circuit in shunt with said electro-magnet winding and not substantially affected by said inductance change therein, said means for progressively increasing the alternating current in the winding being effective simultaneously to increase the current in the comparison circuit, and said electrical circuit means being responsive to the difference between the current taken by the electro-magnet winding and the comparison circuit.

References Cited in the file of this patent

UNITED STATES PATENTS

| | | |
|---|---|---|
| 1,768,446 | Gron | June 24, 1930 |
| 1,826,024 | Roller | Oct. 6, 1931 |

OTHER REFERENCES

Journal of the American Chemical Society, vol. 35, 1913, pp. 1666–1693.

The Review of Scientific Instrument, vol. 22, No. 8, pp. 642–646, August 1951.